United States Patent
Jia et al.

(10) Patent No.: US 12,430,562 B2
(45) Date of Patent: Sep. 30, 2025

(54) FLEXIBLE FRAMEWORK FOR JOINT REPRESENTATION LEARNING AND UNKNOWN CATEGORY DISCOVERY

(71) Applicant: Google LLC, Mountain View, CA (US)

(72) Inventors: Xuhui Jia, Bellingham, WA (US); Yukun Zhu, Seattle, WA (US); Bradley Green, Bellevue, WA (US); Kai Han, Bristol (GB)

(73) Assignee: GOOGLE LLC, Mountain View, CA (US)

( * ) Notice: Subject to any disclaimer, the term of this patent is extended or adjusted under 35 U.S.C. 154(b) by 1008 days.

(21) Appl. No.: 17/493,327

(22) Filed: Oct. 4, 2021

(65) Prior Publication Data

US 2023/0103872 A1   Apr. 6, 2023

(51) Int. Cl.
*G06N 3/088* (2023.01)
*G06N 3/04* (2023.01)

(52) U.S. Cl.
CPC ............... *G06N 3/088* (2013.01); *G06N 3/04* (2013.01)

(58) Field of Classification Search
CPC ................................. G06N 3/088; G06N 3/04
See application file for complete search history.

(56) References Cited

U.S. PATENT DOCUMENTS

| | | |
|---|---|---|
| 9,721,190 B2 | 8/2017 | Vijayanarasimhan et al. |
| 2019/0122111 A1* | 4/2019 | Min .................. G06N 3/045 |
| 2019/0171665 A1* | 6/2019 | Navlakha ............. G06V 10/761 |
| 2021/0104245 A1* | 4/2021 | Aguilar Alas .......... G10L 15/16 |
| 2021/0181757 A1* | 6/2021 | Goel ....................... G05D 1/628 |
| 2022/0164585 A1* | 5/2022 | Ayvaci ................... G06N 3/088 |

OTHER PUBLICATIONS

Le, Q. V. (May 2013). Building high-level features using large scale unsupervised learning. In 2013 IEEE international conference on acoustics, speech and signal processing (pp. 8595-8598). IEEE. (Year: 2013).*

Vijayanarasimhan, S., Shlens, J., Monga, R., & Yagnik, J. (Apr. 2015). Deep networks with large output spaces. arXiv preprint arXiv:1412.7479. (Year: 2015).*

(Continued)

*Primary Examiner* — Oluwatosin Alabi
*Assistant Examiner* — Maggie Thanh Maido
(74) *Attorney, Agent, or Firm* — Botos Churchill IP Law LLP

(57) ABSTRACT

Systems and methods for providing deep learning models capable of performing joint representation learning and new category discovery on a mixture of labeled and unlabeled data, which may include single- and multi-modal data. In some examples, a flexible end-to-end framework uses unified contrastive learning on labeled and unlabeled data based on both instance discrimination and category discrimination, and further uses Winner-Take-All hashing to generate a pseudo-label based on the similarity between each pair of unlabeled data points that can be used to train the model to generate clustering assignments for each unlabeled data point. In some examples, the unified contrastive learning may be further based on cross-modal discrimination.

20 Claims, 6 Drawing Sheets

(56) References Cited

OTHER PUBLICATIONS

Prannay Khosla, Piotr Teterwak, Chen Wang, Aaron Sarna, Yonglong Tian, Phillip Isola, Aaron Maschinot, Ce Liu, and Dilip Krishnan. Supervised contrastive learning. arXiv:2004.11362v3, 2020.
Prannay Khosla, Piotr Teterwak, Chen Wang, Aaron Sarna, Yonglong Tian, Phillip Isola, Aaron Maschinot, Ce Liu, and Dilip Krishnan. Supervised contrastive learning. arXiv:2004.11362v4, 2020.
Prannay Khosla, Piotr Teterwak, Chen Wang, Aaron Sarna, Yonglong Tian, Phillip Isola, Aaron Maschinot, Ce Liu, and Dilip Krishnan. Supervised contrastive learning. arXiv:2004.11362v5, 2021.
Richard Zhang, Phillip Isola, and Alexei A Efros. Split-brain autoencoders: Unsupervised learning by cross-channel prediction. arXiv:1611.09842v1, 2016.
Richard Zhang, Phillip Isola, and Alexei A Efros. Split-brain autoencoders: Unsupervised learning by cross-channel prediction. arXiv:1611.09842v2, 2017.
Richard Zhang, Phillip Isola, and Alexei A Efros. Split-brain autoencoders: Unsupervised learning by cross-channel prediction. arXiv:1611.09842v3, 2017.
Samuli Laine and Timo Aila. Temporal ensembling for semi-supervised learning. arXiv:1610.02242v1, 2016.
Samuli Laine and Timo Aila. Temporal ensembling for semi-supervised learning. arXiv:1610.02242v2, 2016.
Samuli Laine and Timo Aila. Temporal ensembling for semi-supervised learning. arXiv:1610.02242v3, 2017.
Shuiwang Ji, Wei Xu, Ming Yang, and Kai Yu. 3d convolutional neural networks for human action recognition. IEEE TPAMI, 2013.
Spyros Gidaris, Praveer Singh, and Nikos Komodakis. Unsupervised representation learning by predicting image rotations. arXiv:1803.07728v1, 2018.
Sylvestre-Alvise Rebuffi, Sebastien Ehrhardt, Kai Han, Andrea Vedaldi, and Andrew Zisserman. Lsd-c: Linearly separable deep clusters. arXiv:2006.10039v1, 2020.
Sylvestre-Alvise Rebuffi, Sebastien Ehrhardt, Kai Han, Andrea Vedaldi, and Andrew Zisserman. Semi-supervised learning with scarce annotations. arXiv:1905.08845v1, 2019.
Sylvestre-Alvise Rebuffi, Sebastien Ehrhardt, Kai Han, Andrea Vedaldi, and Andrew Zisserman. Semi-supervised learning with scarce annotations. arXiv:1905.08845v2, 2020.
Ting Chen, Simon Kornblith, Mohammad Norouzi, and Geoffrey Hinton. A simple framework for contrastive learning of visual representations. ICML, 2020.
Will Kay, Joao Carreira, Karen Simonyan, Brian Zhang, Chloe Hillier, Sudheendra Vijayanarasimhan, Fabio Viola, Tim Green, Trevor Back, Paul Natsev, et al. The kinetics human action video dataset. arXiv:1705.06950v1, 2017.
Xingyi Zhou, Dequan Wang, and Philipp Krahenbuhl. Objects as points. arXiv:1904.07850v1, 2019.
Xingyi Zhou, Dequan Wang, and Philipp Krahenbuhl. Objects as points. arXiv:1904.07850v2, 2019.
Xu Ji, Joao F Henriques, and Andrea Vedaldi. Invariant information clustering for unsupervised image classification and segmentation. In ICCV, pp. 9865-9874, 2019.
Xuihui Jia, Kai Han, Yukun Zhu, and Bradley Green. Joint Representation Learning and Novel Category Discovery on Single- and Multi-modal Data. arXiv:2104.12673v1, 2021.
Xuihui Jia, Kai Han, Yukun Zhu, and Bradley Green. Joint Representation Learning and Novel Category Discovery on Single- and Multi-modal Data. arXiv:2104.12673v2, 2021.
Yen-Chang Hsu, Zhaoyang Lv, and Zsolt Kira. Learning to cluster in order to transfer across domains and tasks. arXiv:1711.10125v1, 2017.
Yen-Chang Hsu, Zhaoyang Lv, and Zsolt Kira. Learning to cluster in order to transfer across domains and tasks. arXiv:1711.10125v2, 2018.
Yen-Chang Hsu, Zhaoyang Lv, and Zsolt Kira. Learning to cluster in order to transfer across domains and tasks. arXiv:1711.10125v3, 2018.
Yen-Chang Hsu, Zhaoyang Lv, Joel Schlosser, Phillip Odom, and Zsolt Kira. A probabilistic constrained clustering for transfer learning and image category discovery. arXiv:1806.11078v1, 2018.
Yen-Chang Hsu, Zhaoyang Lv, Joel Schlosser, Phillip Odom, and Zsolt Kira. Multi-class classification without multi-class labels. arXiv:1901.00544v1, 2019.
Yonglong Tian, Dilip Krishnan, and Phillip Isola. Contrastive multiview coding. arXiv:1906.05849v1, 2019.
Yonglong Tian, Dilip Krishnan, and Phillip Isola. Contrastive multiview coding. arXiv:1906.05849v2, 2019.
Yonglong Tian, Dilip Krishnan, and Phillip Isola. Contrastive multiview coding. arXiv:1906.05849v3, 2019.
Yonglong Tian, Dilip Krishnan, and Phillip Isola. Contrastive multiview coding. arXiv:1906.05849v4, 2020.
Yonglong Tian, Dilip Krishnan, and Phillip Isola. Contrastive multiview coding. arXiv:1906.05849v5, 2020.
Yuki M. Asano, Mandela Patrick, Christian Rupprecht, and Andrea Vedaldi. Labelling unlabelled videos from scratch with multi-modal self-supervision. arXiv:2006.13662v1, 2020.
Yuki M. Asano, Mandela Patrick, Christian Rupprecht, and Andrea Vedaldi. Labelling unlabelled videos from scratch with multi-modal self-supervision. arXiv:2006.13662v2, 2020.
Yuki M. Asano, Mandela Patrick, Christian Rupprecht, and Andrea Vedaldi. Labelling unlabelled videos from scratch with multi-modal self-supervision. arXiv:2006.13662v3, 2021.
Zhirong Wu, Yuanjun Xiong, Stella X Yu, and Dahua Lin. Unsupervised feature learning via non-parametric instance discrimination. In CVPR, 2018.
Dario Fontanel, Fabio Cermelli, Massimiliano Mancini, Samuel Rota Bulo, Elisa Ricci, and Barbara Caputo. Boosting deep open world recognition by clustering. arXiv:2004.13849v1, 2020.
Dario Fontanel, Fabio Cermelli, Massimiliano Mancini, Samuel Rota Bulo, Elisa Ricci, and Barbara Caputo. Boosting deep open world recognition by clustering. arXiv:2004.13849v2, 2020.
Aaron van den Oord, Yazhe Li, and Oriol Vinyals. Representation learning with contrastive predictive coding. arXiv:1807.03748v1, 2018.
Aaron van den Oord, Yazhe Li, and Oriol Vinyals. Representation learning with contrastive predictive coding. arXiv:1807.03748v2, 2019.
Alex Krizhevsky and Geoffrey Hinton. Learning multiple layers of features from tiny images. Technical report, 2009.
Alina Kuznetsova, Hassan Rom, Neil Alldrin, Jasper Uijlings, Ivan Krasin, Jordi Pont-Tuset, Shahab Kamali, Stefan Popov, Matteo Malloci, Alexander Kolesnikov, et al. The open images dataset v4. arXiv:1811.00982v1, 2018.
Alina Kuznetsova, Hassan Rom, Neil Alldrin, Jasper Uijlings, Ivan Krasin, Jordi Pont-Tuset, Shahab Kamali, Stefan Popov, Matteo Malloci, Alexander Kolesnikov, et al. The open images dataset v4. arXiv:1811.00982v2, 2020.
Antti Tarvainen and Harri Valpola. Mean teachers are better role models: Weight-averaged consistency targets improve semi-supervised deep learning results. In NeurIPS, 2017.
Avital Oliver, Augustus Odena, Colin Raffel, Ekin D. Cubuk, and Ian J. Goodfellow. Realistic evaluation of deep semi-supervised learning algorithms. In NeurIPS, 2018.
Bowen Cheng, Maxwell D Collins, Yukun Zhu, Ting Liu, Thomas S Huang, Hartwig Adam, and Liang-Chieh Chen. Panoptic-deeplab. arXiv:1910.04751v1, 2019.
Bowen Cheng, Maxwell D Collins, Yukun Zhu, Ting Liu, Thomas S Huang, Hartwig Adam, and Liang-Chieh Chen. Panoptic-deeplab. arXiv:1910.04751v2, 2019.
Bowen Cheng, Maxwell D Collins, Yukun Zhu, Ting Liu, Thomas S Huang, Hartwig Adam, and Liang-Chieh Chen. Panoptic-deeplab. arXiv:1910.04751v3, 2019.
Carl Doersch, Abhinav Gupta, and Alexei A. Efros. Unsupervised visual representation learning by context prediction. In ICCV, 2015.
Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In CVPR, 2015.

(56) References Cited

OTHER PUBLICATIONS

Daniel S Park, William Chan, Yu Zhang, Chung-Cheng Chiu, Barret Zoph, Ekin D Cubuk, and Quoc V Le. SpecAugment: A simple data augmentation method for automatic speech recognition. arXiv:1904.08779v1, 2019.
Daniel S Park, William Chan, Yu Zhang, Chung-Cheng Chiu, Barret Zoph, Ekin D Cubuk, and Quoc V Le. SpecAugment: A simple data augmentation method for automatic speech recognition. arXiv:1904.08779v2, 2019.
Daniel S Park, William Chan, Yu Zhang, Chung-Cheng Chiu, Barret Zoph, Ekin D Cubuk, and Quoc V Le. SpecAugment: A simple data augmentation method for automatic speech recognition. arXiv:1904.08779v3, 2019.
Dorin Comaniciu and Peter Meer. Mean shift: A robust approach toward feature space analysis. IEEE TPAMI, 2002.
Du Tran, Heng Wang, Lorenzo Torresani, Jamie Ray, Yann LeCun, and Manohar Paluri. A closer look at spatiotemporal convolutions for action recognition. In CVPR, 2018.
Harold W Kuhn. The Hungarian Method for the Assignment Problem. Naval research logistics quarterly, 1955.
Honglie Chen, Weidi Xie, Andrea Vedaldi, and Andrew Zisserman. Vggsound: A large-scale audio-visual dataset. arXiv:2004.14368v1, 2020.
Honglie Chen, Weidi Xie, Andrea Vedaldi, and Andrew Zisserman. Vggsound: A large-scale audio-visual dataset. arXiv:2004.14368v2, 2020.
Humam Alwassel, Dhruv Mahajan, Lorenzo Torresani, Bernard Ghanem, and Du Tran. Self-supervised learning by cross-modal audio-video clustering. arXiv:1911.12667v1, 2019.
Humam Alwassel, Dhruv Mahajan, Lorenzo Torresani, Bernard Ghanem, and Du Tran. Self-supervised learning by cross-modal audio-video clustering. arXiv:1911.12667v2, 2020.
Humam Alwassel, Dhruv Mahajan, Lorenzo Torresani, Bernard Ghanem, and Du Tran. Self-supervised learning by cross-modal audio-video clustering. arXiv:1911.12667v3, 2020.
Ilya Sutskever, James Martens, George Dahl, and Geoffrey Hinton. On the importance of initialization and momentum in deep learning. In ICML, 2013.
James MacQueen. Some methods for classification and analysis of multivariate observations. In Proceedings of the Fifth Berkeley Symposium on Mathematical Statistics and Probability, 1967.
Jay Yagnik, Dennis Strelow, David A. Ross, and Ruei sung Lin. The power of comparative reasoning. In ICCV, 2011.
Jean-Baptiste Alayrac, Adria Recasens, Rosalia Schneider, Relja Arandjelovic, Jason Ramapuram, Jeffrey De Fauw, Lucas Smaira, Sander Dieleman, and Andrew Zisserman. Self-supervised multimodal versatile networks. arXiv:2006.16228v1, 2020.
Jean-Baptiste Alayrac, Adria Recasens, Rosalia Schneider, Relja Arandjelovic, Jason Ramapuram, Jeffrey De Fauw, Lucas Smaira, Sander Dieleman, and Andrew Zisserman. Self-supervised multimodal versatile networks. arXiv:2006.16228v2, 2020.
Jia Deng, Wei Dong, Richard Socher, Li-Jia Li, Kai Li, and Li Fei-Fei. Imagenet: A large-scale hierarchical image database. In CVPR, 2009.
Junyuan Xie, Ross Girshick, and Ali Farhadi. Unsupervised deep embedding for clustering analysis. In ICML, 2016.
Kai Han, Andrea Vedaldi, and Andrew Zisserman. Learning to discover novel visual categories via deep transfer clustering. In ICCV, 2019.
Kai Han, Sylvestre-Alvise Rebuffi, Sebastien Ehrhardt, Andrea Vedaldi, and Andrew Zisserman. Automatically discovering and learning new visual categories with ranking statistics. arXiv:2002.05714v1, 2020.
Kaiming He, Haoqi Fan, Yuxin Wu, Saining Xie, and Ross Girshick. Momentum contrast for unsupervised visual representation learning. CVPR, 2020.
Kaiming He, Xiangyu Zhang, Shaoqing Ren, and Jian Sun. Deep residual learning for image recognition. In CVPR, 2016.
Kamran Ghasedi Dizaji, Amirhossein Herandi, Cheng Deng, Weidong Cai, and Heng Huang. Deep clustering via joint convolutional autoencoder embedding and relative entropy minimization. In ICCV, 2017.
Mandela Patrick, Yuki M Asano, Ruth Fong, Joao F Henriques, Geoffrey Zweig, and Andrea Vedaldi. Multi-modal self-supervision from generalized data transformations. arXiv:2003.04298v1, 2020.
Mandela Patrick, Yuki M Asano, Ruth Fong, Joao F Henriques, Geoffrey Zweig, and Andrea Vedaldi. Multi-modal self-supervision from generalized data transformations. arXiv:2003.04298v2, 2020.
Michael Gutmann and Aapo Hyvarinen. Noise-contrastive estimation: A new estimation principle for unnormalized statistical models. In Proceedings of the Thirteenth International Conference on Artificial Intelligence and Statistics, pp. 297-304, 2010.
Mingxing Tan, Ruoming Pang, and Quoc V Le. EfficientDet: Scalable and efficient object detection. In CVPR, 2020.
Mohan Zhou, Yalong Bai, Wei Zhang, Tiejun Zhao, and Tao Mei. Look-into-object: Self-supervised structure modeling for object recognition. In CVPR, 2020.
Olivier Chapelle, Bernhard Scholkopf, and Alexander Zien. Semi-Supervised Learning. MIT Press, 2006. [Part 1 of 4, pp. 1-114].
Olivier Chapelle, Bernhard Scholkopf, and Alexander Zien. Semi-Supervised Learning. MIT Press, 2006. [Part 2 of 4, pp. 115-251].
Olivier Chapelle, Bernhard Scholkopf, and Alexander Zien. Semi-Supervised Learning. MIT Press, 2006. [Part 3 of 4, pp. 252-385].
Olivier Chapelle, Bernhard Scholkopf, and Alexander Zien. Semi-Supervised Learning. MIT Press, 2006. [Part 4 of 4, pp. 386-509].
Pedro Morgado, Nuno Vasconcelos, and Ishan Misra. Audiovisual instance discrimination with cross-modal agreement. arXiv:2004.12943v1, 2020.
Pedro Morgado, Nuno Vasconcelos, and Ishan Misra. Audiovisual instance discrimination with cross-modal agreement. arXiv:2004.12943v2, 2020.
Pedro Morgado, Nuno Vasconcelos, and Ishan Misra. Audiovisual instance discrimination with cross-modal agreement. arXiv:2004.12943v3, 2021.
Prannay Khosla, Piotr Teterwak, Chen Wang, Aaron Sarna, Yonglong Tian, Phillip Isola, Aaron Maschinot, Ce Liu, and Dilip Krishnan. Supervised contrastive learning. arXiv:2004.11362v1, 2020.
Prannay Khosla, Piotr Teterwak, Chen Wang, Aaron Sarna, Yonglong Tian, Phillip Isola, Aaron Maschinot, Ce Liu, and Dilip Krishnan. Supervised contrastive learning. arXiv:2004.11362v2, 2020.

* cited by examiner

416

Generate an unsupervised loss value for the batch of training data based on the generated second predictions and the generated hash codes

418

Generate a total loss value for the batch of training data based on the unified contrastive loss value, the supervised loss value, and the unsupervised loss value

420

Modify one or more parameters of the neural network based on the total loss value 400 (cont.)

FIG. 4B

FLEXIBLE FRAMEWORK FOR JOINT REPRESENTATION LEARNING AND UNKNOWN CATEGORY DISCOVERY

BACKGROUND

While deep learning models can outperform humans on selected tasks when properly trained, doing so generally requires huge amounts of human-annotated training data relevant to those tasks. Moreover, although some deep learning models may be configured to recognize similarities between labeled and unlabeled training examples, and to classify the unlabeled data with a preexisting category from one or more similar labeled examples, such models may not be capable of classifying the unlabeled training data with a new category that was not represented in the labeled training data. Such models may thus be costly to train (in terms of compute cycles and in terms of the cost of generating adequate amounts of human-annotated training data), and may be unsuited to real-world "open" environments where the model is continually exposed to data from new categories it has not yet encountered.

BRIEF SUMMARY

The present technology concerns systems and methods for providing deep learning models capable of performing joint representation learning and new category discovery on a mixture of labeled and unlabeled data, which may include single- and multi-modal data. In that regard, in some aspects of the technology, the disclosure describes a flexible end-to-end framework using unified contrastive learning on labeled and unlabeled data based on both instance discrimination and category discrimination, and further uses Winner-Take-All ("WTA") hashing to generate a pseudo-label based on the similarity between each pair of unlabeled data points that can be used to train the model to generate clustering assignments for each unlabeled data point. Further, in some aspects of the technology, the unified contrastive learning may be further based on cross-modal discrimination. In this way, the disclosure describes an end-to-end trainable framework in which a deep-learning model can simultaneously learn feature representations and perform cluster assignments from a mixture of labeled and unlabeled data using a unified loss function.

In one aspect, the disclosure describes a method of training a neural network to classify data, comprising: (a) for each given original instance in a batch of training data comprising a plurality of original instances and a plurality of modified instances, performing instance discrimination to generate a first loss value, using one or more processors of a processing system, based on an embedded representation of the given original instance and an embedded representation of the modified instance corresponding to the given original instance; (b) for each given instance in the batch of training data having a label identifying a given category: (1) identifying, using the one or more processors, a set of instances in the batch having a label identifying the given category; and (2) performing category discrimination to generate a second loss value, using the one or more processors, based on an embedded representation of the given instance and an embedded representation of each instance in the identified set of instances; (c) generating, using the one or more processors, a unified contrastive loss value for the batch of training data based on the generated first loss values and the generated second loss values; (d) for each given instance in the batch of training data having a label identifying one or more of a first plurality of categories: (1) generating, using the one or more processors, a first prediction regarding whether the given instance belongs to one or more of the first plurality of categories; and (2) generating, using the one or more processors, a third loss value based on the first prediction and the label; (e) generating, using the one or more processors, a supervised loss value for the batch of training data based on the generated third loss values; (f) for each given instance in the batch of training data not having a label: (1) generating, using the one or more processors, a second prediction regarding whether the given instance belongs to one or more of a second plurality of categories, the second plurality of categories being different than the first plurality of categories; and (2) performing winner-take-all hashing, using the one or more processors, on a vector representation of the given instance to generate a hash code corresponding to the given instance; (g) generating, using the one or more processors, an unsupervised loss value for the batch of training data based on the generated second predictions and the generated hash codes; (h) generating, using the one or more processors, a total loss value for the batch of training data based on the unified contrastive loss value, the supervised loss value, and the unsupervised loss value; and (i) modifying, using the one or more processors, one or more parameters of the neural network based on the total loss value. In some aspects, the method further comprises generating, using the one or more processors, the batch of training data, wherein generating the batch of training data comprises identifying the plurality of original instances and the plurality of modified instances to be included in the batch. In some aspects, the method further comprises generating, using the one or more processors, the batch of training data, wherein generating the batch of training data comprises, for each given original instance, generating a modified instance corresponding to the given original instance. In some aspects, for each given original instance in the batch of training data, performing instance discrimination to generate the first loss value further comprises: generating, using the one or more processors, the embedded representation of the given original instance by processing the given original instance using a feature encoder to generate a first feature vector, and processing the first feature vector using a multi-layer perceptron; and generating, using the one or more processors, the embedded representation of the modified instance corresponding to the given original instance by processing the modified instance corresponding to the given original instance using a feature encoder to generate a second feature vector, and processing the second feature vector using a multi-layer perceptron. In some aspects, for each given instance in the batch of training data having a label identifying a given category, performing category discrimination to generate the second loss value for each given instance further comprises: generating, using the one or more processors, the embedded representation of the given instance by processing the given instance using a feature encoder to generate a third feature vector, and processing the third feature vector using a multi-layer perceptron. In some aspects, the method further comprises: (a) for each given original instance in the batch of training data: (1) if the given original instance has a label, generating a fourth loss value, using the one or more processors, based on the first prediction generated for the given original instance and the first prediction generated for the modified instance corresponding to the given original instance; and (2) if the given original instance does not have a label, generating a fifth loss value, using the one or more processors, based on the second prediction generated for the given original instance and the second prediction generated for the modified instance corresponding to the given original instance; and (b) generating, using the one or more processors, a consistency loss value for the batch of training data based on the generated fourth loss values and the generated fifth loss values; wherein generating the total loss value for the batch of training data is further based on the consistency loss value. In some aspects, the method further comprises generating, using the one or more processors, the batch of training data, wherein generating the batch of training data comprises identifying the plurality of original instances and the plurality of modified instances to be included in the batch. In some aspects, the method further comprises generating, using the one or more processors, the batch of training data, wherein generating the batch of training data comprises, for each given original instance, generating a modified instance corresponding to the given original instance. In some aspects, for each given original instance in the batch of training data, performing instance discrimination to generate the first loss value further comprises: generating, using the one or more processors, the embedded representation of the given original instance by processing the given original instance using a feature encoder to generate a first feature vector, and processing the first feature vector using a multi-layer perceptron; and generating, using the one or more processors, the embedded representation of the modified instance corresponding to the given original instance by processing the modified instance corresponding to the given original instance using a feature encoder to generate a second feature vector, and processing the second feature vector using a multi-layer perceptron. In some aspects, for each given instance in the batch of training data having a label identifying a given category, performing category discrimination to generate the second loss value for each given instance further comprises: generating, using the one or more processors, the embedded representation of the given instance by processing the given instance using a feature encoder to generate a third feature vector, and processing the third feature vector using a multi-layer perceptron.

In another aspect, the disclosure describes a processing system comprising: a memory storing a neural network; and one or more processors coupled to the memory and configured to use the neural network to classify data, wherein the neural network has been trained to classify data pursuant to a training method comprising: (a) for each given original instance in a batch of training data comprising a plurality of original instances and a plurality of modified instances, performing instance discrimination to generate a first loss value based on an embedded representation of the given original instance and an embedded representation of the modified instance corresponding to the given original instance; (b) for each given instance in the batch of training data having a label identifying a given category: (1) identifying a set of instances in the batch having a label identifying the given category; and (2) performing category discrimination to generate a second loss value based on an embedded representation of the given instance and an embedded representation of each instance in the identified set of instances; (c) generating a unified contrastive loss value for the batch of training data based on the generated first loss values and the generated second loss values; (d) for each given instance in the batch of training data having a label identifying one or more of a first plurality of categories: (1) generating a first prediction regarding whether the given instance belongs to one or more of the first plurality of categories; and (2) generating a third loss value based on the first prediction and the label; (e) generating a supervised loss value for the batch of training data based on the generated third loss values; (f) for each given instance in the batch of training data not having a label: (1) generating a second prediction regarding whether the given instance belongs to one or more of a second plurality of categories, the second plurality of categories being different than the first plurality of categories; and (2) performing winner-take-all hashing on a vector representation of the given instance to generate a hash code corresponding to the given instance; (g) generating an unsupervised loss value for the batch of training data based on the generated second predictions and the generated hash codes; (h) generating a total loss value for the batch of training data based on the unified contrastive loss value, the supervised loss value, and the unsupervised loss value; and (i) modifying one or more parameters of the neural network based on the total loss value. In some aspects, the training method further comprises generating the batch of training data, wherein generating the batch of training data comprises identifying the plurality of original instances and the plurality of modified instances to be included in the batch. In some aspects, the training method further comprises generating the batch of training data, wherein generating the batch of training data comprises, for each given original instance, generating a modified instance corresponding to the given original instance. In some aspects, the step of the training method directed to, for each given original instance in the batch of training data, performing instance discrimination to generate the first loss value further comprises: generating the embedded representation of the given original instance by processing the given original instance using a feature encoder to generate a first feature vector, and processing the first feature vector using a multi-layer perceptron; and generating the embedded representation of the modified instance corresponding to the given original instance by processing the modified instance corresponding to the given original instance using a feature encoder to generate a second feature vector, and processing the second feature vector using a multi-layer perceptron. In some aspects, the step of the training method directed to, for each given instance in the batch of training data having a label identifying a given category, performing category discrimination to generate the second loss value for each given instance further comprises: generating the embedded representation of the given instance by processing the given instance using a feature encoder to generate a third feature vector, and processing the third feature vector using a multi-layer perceptron. In some aspects, the training method further comprises: (a) for each given original instance in the batch of training data: (1) if the given original instance has a label, generating a fourth loss value based on the first prediction generated for the given original instance and the first prediction generated for the modified instance corresponding to the given original instance; and (2) if the given original instance does not have a label, generating a fifth loss value based on the second prediction generated for the given original instance and the second prediction generated for the modified instance corresponding to the given original instance; and (b) generating a consistency loss value for the batch of training data based on the generated fourth loss values and the generated fifth loss values; wherein generating the total loss value for the batch of training data is further based on the consistency loss value. In some aspects, the training method further comprises generating the batch of training data, wherein generating the batch of training data comprises identifying the plurality of original instances and the plurality of modified instances to be included in the batch. In some aspects, the training method further comprises generating the batch of training data, wherein generating the batch of training data comprises, for each given original instance, generating a modified instance corresponding to the given original instance. In some aspects, the step of the training method directed to, for each given original instance in the batch of training data, performing instance discrimination to generate the first loss value further comprises: generating the embedded representation of the given original instance by processing the given original instance using a feature encoder to generate a first feature vector, and processing the first feature vector using a multi-layer perceptron; and generating the embedded representation of the modified instance corresponding to the given original instance by processing the modified instance corresponding to the given original instance using a feature encoder to generate a second feature vector, and processing the second feature vector using a multi-layer perceptron. In some aspects, the step of the training method directed to, for each given instance in the batch of training data having a label identifying a given category, performing category discrimination to generate the second loss value for each given instance further comprises: generating the embedded representation of the given instance by processing the given instance using a feature encoder to generate a third feature vector, and processing the third feature vector using a multi-layer perceptron.

BRIEF DESCRIPTION OF THE DRAWINGS

FIGS. 4A and 4B depict an exemplary method showing how a deep learning model may be trained, in accordance with aspects of the disclosure.

DETAILED DESCRIPTION

The present technology will now be described with respect to the following exemplary systems and methods.

Example Systems

Figure 1:
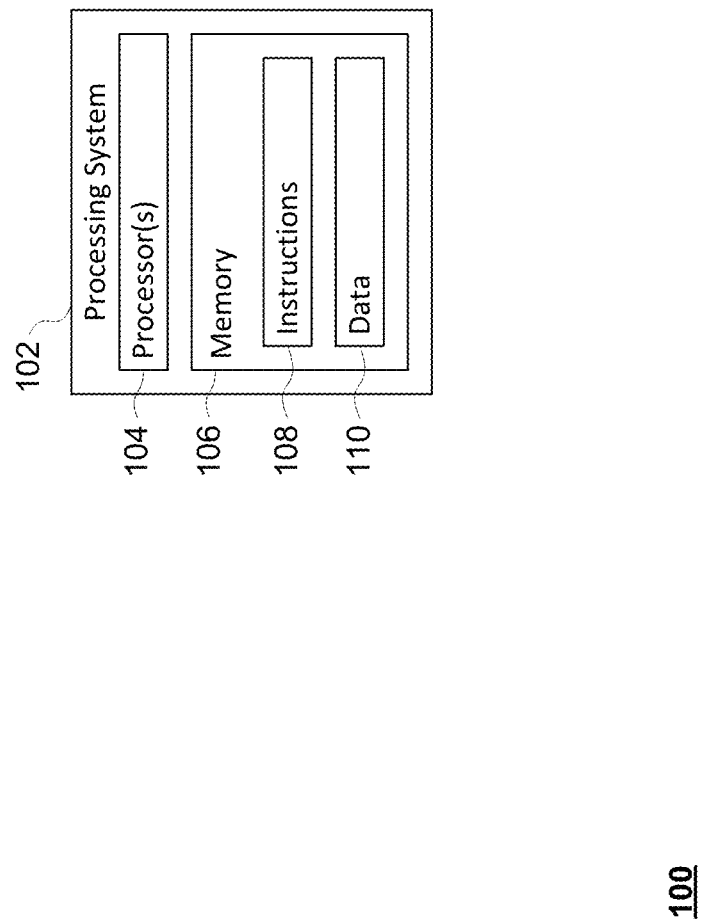
FIG. 1 is a functional diagram of an example system, in accordance with aspects of the disclosure.

FIG. 1 shows a high-level system diagram 100 of an exemplary processing system 102 for performing the methods described herein. The processing system 102 may include one or more processors 104 and memory 106 storing instructions 108 and data 110. The instructions 108 and data 110 may include a deep learning model, such as those described herein. In addition, the data 110 may store data (e.g., image files, audio files, video files) and/or training examples to be used in training the deep learning model, and/or data to be used during inference. Processing system 102 may be resident on a single computing device. For example, processing system 102 may be a server, personal computer, or mobile device, and a deep learning model may thus be local to that single computing device. Similarly, processing system 102 may be resident on a cloud computing system or other distributed system. In such a case, a deep learning model may be distributed across two or more different physical computing devices. For example, in some aspects of the technology, the processing system may comprise a first computing device storing layers 1-n of a deep learning model having m layers, and a second computing device storing layers n-m of the deep learning model.

Figure 2:
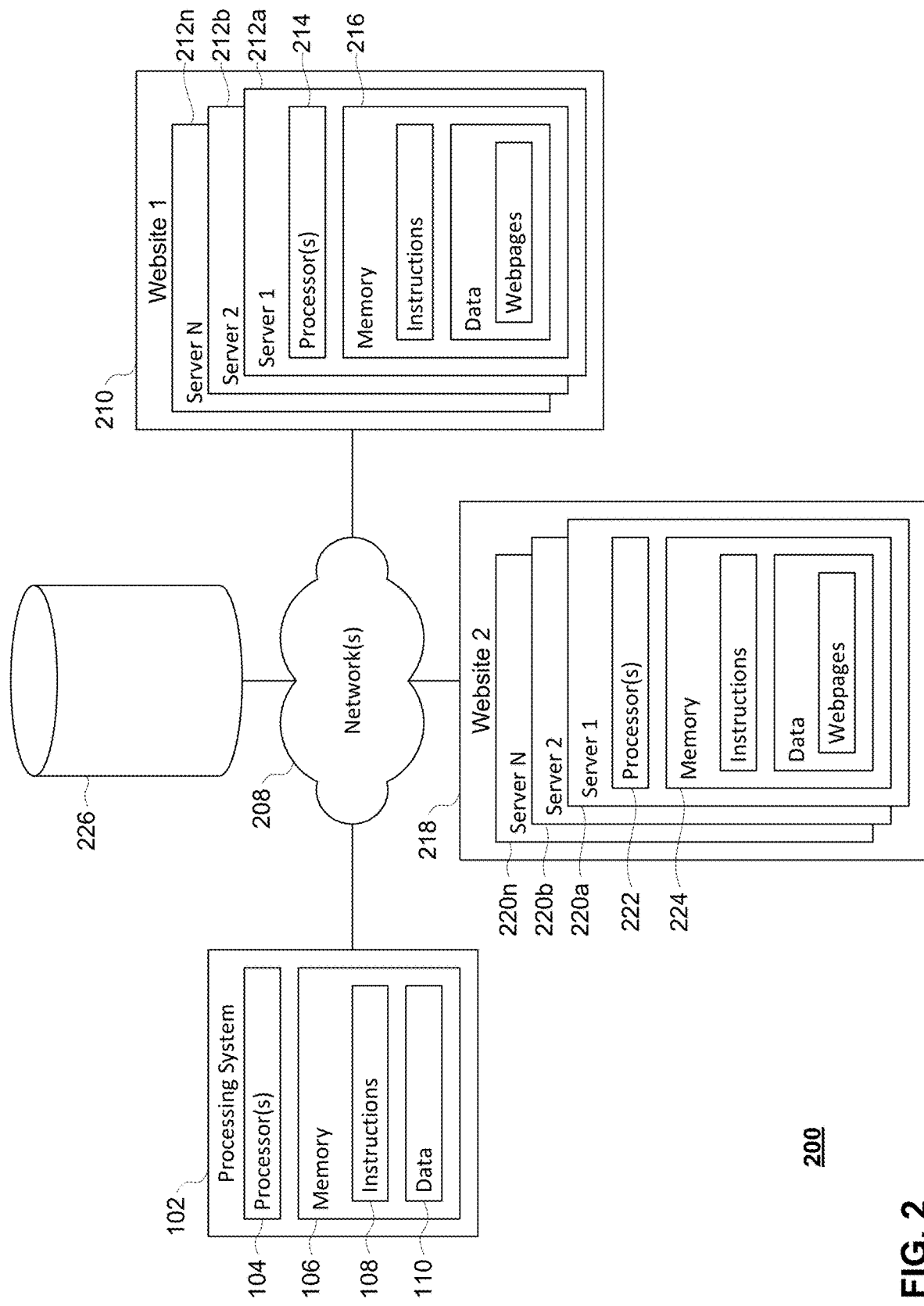
FIG. 2 is a functional diagram of an example system, in accordance with aspects of the disclosure.

Further in this regard, FIG. 2 shows a high-level system diagram 200 in which the exemplary processing system 102 just described is shown in communication with various websites and/or remote storage systems over one or more networks 208, including websites 210 and 218 and remote storage system 226. In this example, websites 210 and 218 each include one or more servers 212a-212n and 220a-220n, respectively. Each of the servers 212a-212n and 220a-220n may have one or more processors (e.g., 214 and 222), and associated memory (e.g., 216 and 224) storing instructions and data, including the content of one or more webpages. Likewise, although not shown, remote storage system 226 may also include one or more processors and memory storing instructions and data. In some aspects of the technology, the processing system 102 may be configured to retrieve data and/or training examples from one or more of website 210, website 218, and/or remote storage system 226 to be provided to a deep learning model for training or inference. For example, in some aspects, the processing system 102 may be configured to retrieve a set of labeled training examples from remote storage system 226, and to retrieve a set of unlabeled data (e.g., image files, audio files, video files) from one or more of website 210 or website 218.

The processing systems described herein may be implemented on any type of computing device(s), such as any type of general computing device, server, or set thereof, and may further include other components typically present in general purpose computing devices or servers. Likewise, the memory of such processing systems may be of any non-transitory type capable of storing information accessible by the processor(s) of the processing systems. For instance, the memory may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

Figure 3:
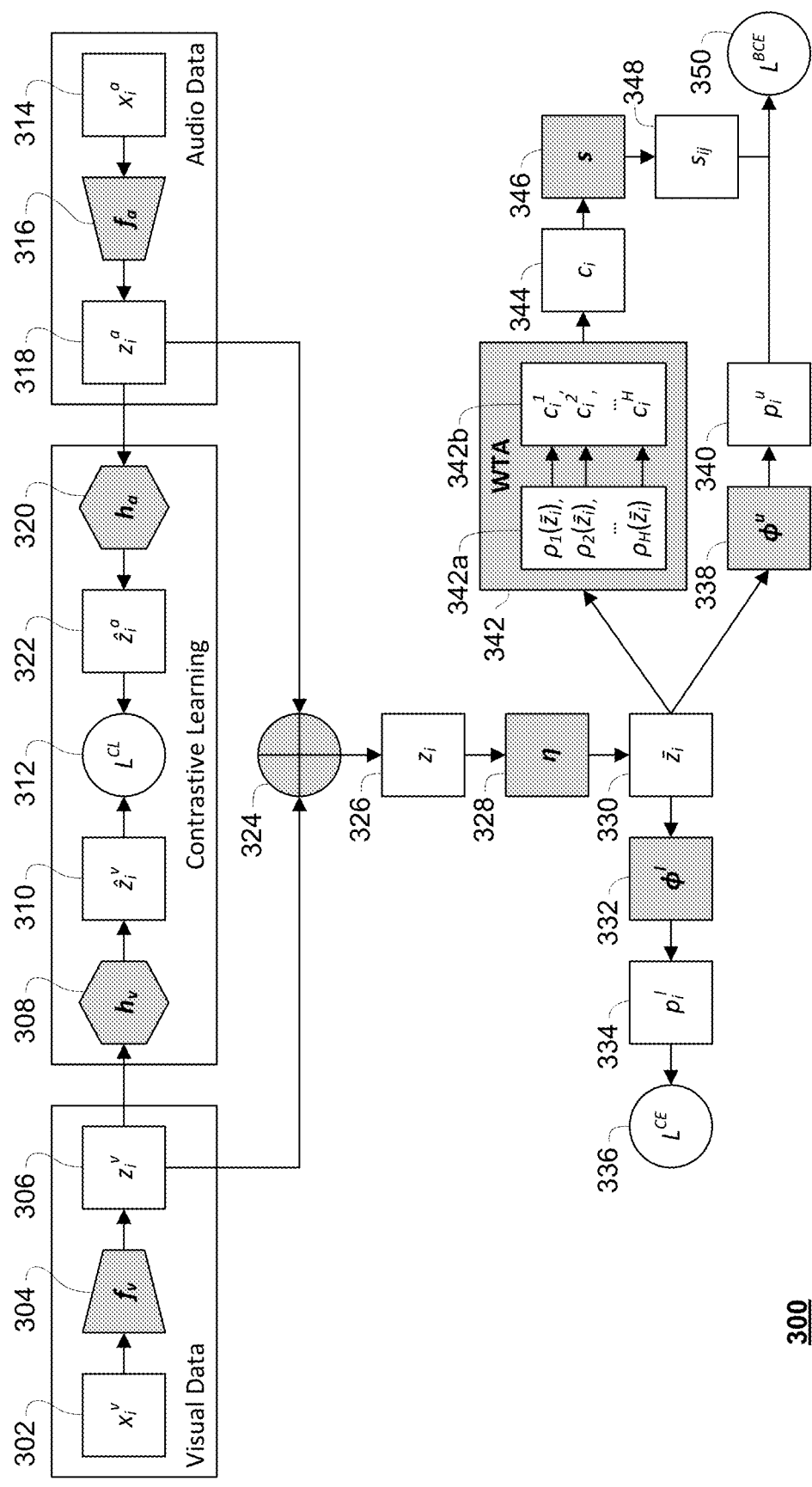
FIG. 3 is a flow diagram illustrating how a deep learning model may be trained, in accordance with aspects of the disclosure.

FIG. 3 shows a flow diagram 300 illustrating how a deep learning model may be trained, in accordance with aspects of the disclosure. In that regard, in the example of FIG. 3, the training data is assumed to be a collection of labeled and unlabeled data, and may comprise image data, audio data, and/or video data.

For single-modal image data, the image data $x_i^v$(302) is fed to a visual feature encoder $f_v$ (304) to generate a corresponding feature vector $z_i^v$(306). Similarly, for single-modal audio data, the audio data $x_i^a$(314) is fed to an audio feature encoder $f_a$ (316) to generate a corresponding feature vector $z_i^a$ (318). The visual feature encoder $f_v$(304) and audio feature encoder $f_a$ (316) may be of any suitable type and configuration. For example, in some aspects of the technology, the visual feature encoder $f_v$ (304) may be an 18-layer ResNet-18 convolutional neural network trained to classify images, and the audio feature encoder $f_a$ (316) may be a separate 18-layer ResNet-18 convolutional neural network trained to classify audio data. The visual feature encoder $f_v$(304) and audio feature encoder $f_a$ (316) may also be configured to produce feature vectors $z_i^v$(306) and $z_i^a$ (318) of any suitable dimension. For example, in some aspects of the technology, feature vectors $z_i^v$(306) and $z_i^a$(318) may both have a dimension of 512.

For a multi-modal video clip $x_i$, the processing system (e.g., processing system 102) may be configured to break the video clip into a corresponding visual stream $x_i^v$ and audio stream $x_i^a$ for processing. The visual stream $x_i^v$(302) may then be fed to visual feature encoder $f_v$ (304) to generate a corresponding feature vector $z_i^v$(306), and the audio stream $x_i^a$(314) may be fed to an audio feature encoder $f_a$ (316) to generate a corresponding feature vector $z_i^a$(318). Here as well, any suitable type and configuration of visual feature encoder $z_v$(304) and audio feature encoder $f_a$ (316) may be used. For example, a 3D convolutional neural network such as an 18-layer ResNet R3D-18 may be used to generate feature vectors $z_i^v$(306) and $z_i^a$(318). Likewise, the visual feature encoder $f_v$(304) and audio feature encoder $f_a$ (316) used for processing multi-modal video clips may be configured to generate feature vectors $z_i^v$(306) and $z_i^a$(318) that have the same dimension as those generated by the separate visual feature encoder $f_v$(304) and audio feature encoder $f_a$ (316) used for processing single-modal visual data and single-modal audio data. Thus, the visual feature encoder $f_v$(304) and audio feature encoder $f_a$ (316) used for processing multi-modal video clips may be configured to output feature vectors $z_i^v$(306) and $z_i^a$(318) of dimension 512.

For contrastive learning on single-modal image data or the video stream of multi-modal video data, the resulting feature vector $z_i^v$(306) is processed by a multi-layer perceptron ("MLP") $h_v$(308) to generate an embedded representation $\hat{z}_i^v$(310). Similarly, for single-modal audio data or the audio stream of multi-modal video data, the resulting feature vector $z_i^a$(318) is processed by another MLP $h_a$ (320) to generate an embedded representation $\hat{z}_i^a$(322). The MLPs $h_v$(308) and $h_a$ (320) may be of any suitable type and configuration. For example, in some aspects of the technology, MLPs $h_v$(308) and $h_a$ (320) may each comprise a hidden layer of size 512, a linear layer of size 128, and an L2 normalization layer.

In addition to the above, the processing system will augment the training data by generating one or more modified counterparts for each instance of training data. Thus, for single-modal image data or the video stream of multi-modal video data, the image data $x_i^v$ will be modified using one or more transformation functions to generate a modified counterpart $x_{i'}^v$. The resulting modified counterpart $x_{i'}^v$ will be processed in the same manner described above to generate a corresponding feature vector $z_{i'}^v$ and a corresponding embedded representation $\hat{z}_{i'}^v$. The processing system may use any suitable paradigm for assigning and/or tracking indices i and i' of each given instance and its modified counterpart such that they can be associated as needed (e.g., for Equations 1, 4, and 10 below).

Any suitable transformation functions may be used to generate a modified counterpart from a given instance. For example, in some aspects of the technology, the processing system may be configured to modify image data $x_i^v$ by resizing the image, horizontally flipping the image, applying cropping, applying color distortion, and/or applying Gaussian blur. Likewise, in some aspects of the technology, the processing system may be configured to modify video stream data $x_i^v$ by resizing and/or cropping the video frames.

Likewise, for single-modal audio data or the audio stream of multi-modal video data, the audio data $x_i^a$ will be modified using one or more transformation functions to generate a modified counterpart $x_{i'}^a$. The resulting modified counterpart $x_{i'}^a$ will also be processed as described above to generate a corresponding feature vector $z_{i'}^a$ and a corresponding embedded representation $\hat{z}_{i'}^a$. Here as well, any suitable transformation functions may be used in this regard. For example, in some aspects of the technology, the processing system may be configured to modify audio data $x_i^a$ into a set of Mel-frequency cepstral coefficients (MFCCs).

It will now be described how the processing system may generate a unified contrastive loss value $L^{CL}$ (312) based on the embedded representations for a set of single-modal training data. In that regard, the processing system will first generate an embedded representation $\hat{z}_i$ (as described above) for each instance of training data in a batch B of labeled and unlabeled data. In this example, it is assumed that batch B will have N original instances of training data, as well as a modified counterpart corresponding to each of those N original instances of training data, for a total of 2N instances of training data.

In the example of FIG. 3, it is assumed that the processing system will perform instance discrimination based on every possible pairing of an original instance of single-modal training data $x_i$ and its modified counterpart $x_{i'}$. Any suitable loss function may be used in this regard. For example, in some aspects of the technology, the processing system may employ noise-contrastive estimation ("NCE") for instance discrimination, according to Equation 1 below:

$$L_i^{NCE-I} = -\log \frac{\exp(\hat{z}_i \cdot \hat{z}_{i'} / \tau)}{\sum_{n=1}^{2N} \mathbb{1}_{[n \neq i]} \exp(\hat{z}_i \cdot \hat{z}_n / \tau)} \quad (1)$$

In Equation 1, i is the index of a given instance of training data, i' is the index of the modified counterpart to instance i, and batch B has a set of training data with indices from 1 to 2N. The function $\mathbb{1}_{[n \neq i]}$ is an indicator function which returns 1 if n is not equal to i, and which returns 0 if n is equal to i. The variable $\tau$ is a scalar temperature parameter. The scalar temperature parameter $\tau$ may be any suitable value, and may be user-defined.

In the example of FIG. 3, it is further assumed that, for each instance of single-modal labeled training data, the processing system will also perform category discrimination based on every possible pairing of that instance of labeled training data $x_i$ and any other instances of training data $x_q$ that are labeled with the same category as $x_i$. Here as well, any suitable loss function may be used in this regard. For example, in some aspects of the technology, the processing system may likewise employ noise-contrastive estimation for category discrimination, according to Equation 2 below:

$$L_i^{NCE-C} = -\frac{1}{|Q(i)|} \sum_{q \in Q(i)} \log \frac{\exp(\hat{z}_i \cdot \hat{z}_q / \tau)}{\sum_{n=1}^{2N} \mathbb{1}_{[n \neq i]} \exp(\hat{z}_i \cdot \hat{z}_n / \tau)} \quad (2)$$

In Equation 2, i is the index of a given instance of labeled training data, Q(i) is a set of the indices of all instances of training data that have the same label as the given instance, and q is an element of Q(i). The function $\mathbb{1}_{[n \neq i]}$ is the same indicator function described above. Likewise, $\tau$ is a scalar temperature parameter which may have a value that is the same as or different than the value used in Equation 1. Here again, the scalar temperature parameter $\tau$ may be a user-defined value, or may be one of the parameters that is updated during back-propagation as the deep model is trained.

Once $L_i^{NCE-I}$ values have been calculated for every possible pairing of an original instance of single-modal training data $x_i$ and its modified counterpart $x_{i'}$, and $L_i^{NCE-C}$ values have been calculated for every instance of labeled single-modal training data, the processing system may use those loss values to generate a unified contrastive loss value $L^{CL}$ (312). Any suitable way of combining the $L_i^{NCE-I}$ and $L_i^{NCE-C}$ values may be used in this regard. For example, in some aspects of the technology, the processing system may generate a unified contrastive loss value $L^{CL}$ according to Equation 3 below:

$$L^{CL} = \frac{1}{2N} \sum_{i=1}^{2N} \left( L_i^{NCE-I} + L_i^{NCE-C} \right) \quad (3)$$

A similar approach may be used for generating a unified contrastive loss value $L^{CL}$ (312) based on the embedded representations for a set of multi-modal training data. Here again, the processing system will first generate an embedded representation (as described above) for each instance of training data in a batch B of labeled and unlabeled data. In this case, as the data is multi-modal, the embedded representation $\hat{z}_i$ for a given instance i will include an embedded representation for each modality of instance i. For example, for an instance that is a video clip, the processing system may generate a first embedded representation $\hat{z}_i^v$ for the instance's video stream and a second embedded representation $\hat{z}_i^a$ for the instance's audio stream, such that $\hat{z}_i = \{\hat{z}_i^v, \hat{z}_i^a\}$. In this example as well, it is assumed that batch B will have N original instances of training data, and a modified counterpart corresponding to each of those N original instances of training data, for a total of 2N instances of training data.

As with the single-modal data, the processing system may perform instance discrimination based on every possible pairing of an original instance of multi-modal training data $x_i$ and its modified counterpart $x_{i'}$. Here again, any suitable loss function may be used in this regard. Thus, in some aspects of the technology, the processing system may employ noise-contrastive estimation for instance discrimination, according to Equation 4 below:

$$L_i^{NCE-I} = -\log \frac{\exp(g_0(\hat{z}_i) \cdot g_1(\hat{z}_{i'}) / \tau)}{\sum_{n=1}^{2N} \mathbb{1}_{[n \neq i]} \exp(g_0(\hat{z}_i) \cdot g_1(\hat{z}_n) / \tau)} \quad (4)$$

In Equation 4, i is the index of a given instance of training data, i' is the index of the modified counterpart to instance i, and batch B has a set of training data with indices from 1 to 2N. The function $\mathbb{1}_{[n \neq i]}$ is the same indicator function described above. Likewise, $\tau$ is a scalar temperature parameter which may have a value that is the same as or different than the values used in Equations 1 and/or 2. Here again, the scalar temperature parameter $\tau$ may be a user-defined value, or may be one of the parameters that is updated during back-propagation as the deep model is trained.

Functions $g_0$ and $g_1$ are modality-selecting functions that may be configured to select the same modality of an embedded representation or a different modality. Thus, if $g_0$ and $g_1$ are configured to perform within-modal discrimination, then $g_0(\hat{z}_i)$ may select the embedded representation of the video stream of $\hat{z}_i$ (which is $\hat{z}_i^v$), and $g_1(\hat{z}_i)$ would likewise select the embedded representation of the video stream of $\hat{z}_{i'}$ (which is $\hat{z}_{i'}^v$). On the other hand, if $g_0$ and $g_1$ are configured to perform cross-modal discrimination, then $g_0(\hat{z}_i)$ may select the embedded representation of the video stream of $\hat{z}_i$ (which is $\hat{z}_i^v$), and $g_1(\hat{z}_i)$ would select the embedded representation of the audio stream of $\hat{z}_{i'}$ (which is $\hat{z}_{i'}^a$).

For within-modal discrimination, the processing system may be configured to generate $L_i^{NCE-I}$ values for each modality, such that, in a first pass, $g_0$ and $g_1$ are configured to perform within-modal discrimination based on the first modality (e.g., the embedded representations for the video streams of each instance), and, in a second pass, $g_0$ and $g_1$ are configured to perform within-modal discrimination based on the second modality (e.g., the embedded representations for the audio streams of each instance).

Likewise, for cross-modal discrimination, the processing system may be configured to generate $L_i^{NCE-I}$ values for each possible cross-modal pairing such that, in a first pass, $g_0$ is configured to select the first modality (e.g., the embedded representation for the video stream of its argument) and $g_1$ is configured to select the second modality (e.g., the embedded representation for the audio stream of its argument), and, in a second pass, $g_0$ is configured to select the second modality (e.g., the embedded representation for the audio stream of its argument) and $g_1$ is configured to select the first modality (e.g., the embedded representation for the video stream of its argument).

Further, in some aspects of the technology, the processing system may be configured to generate both cross-modal and within-modal $L_i^{NCE-I}$ values, and to sum all such values in the unified contrastive loss value $L^{CL}$.

In addition, for each instance of multi-modal labeled training data, the processing system may perform category discrimination based on every possible pairing of that instance of labeled training data $x_i$ and any other instances of training data $x_q$ that are labeled with the same category as $x_i$. Here again, any suitable loss function may be used in this regard. Thus, in some aspects of the technology, the processing system may likewise employ noise-contrastive estimation for category discrimination, according to Equation 5 below:

$$L_i^{NCE-C} = -\frac{1}{|Q(i)|} \sum_{q \in Q(i)} \log \frac{\exp(g_0(\hat{z}_i) \cdot g_1(\hat{z}_q)/\tau)}{\sum_{n=1}^{2N} \mathbb{1}_{[n \neq i]} \exp(g_0(\hat{z}_i) \cdot g_1(\hat{z}_n)/\tau)} \quad (5)$$

In Equation 5, i is the index of a given instance of labeled training data, Q(i) is a set of the indices of all instances of training data that have the same label as the given instance, and q is an element of Q(i). The function $\mathbb{1}_{[n \neq i]}$ is the same indicator function described above. Likewise, $\tau$ is a scalar temperature parameter which may have a value that is the same as or different than the values used in any of Equations 1, 2, and/or 4. Here again, the scalar temperature parameter $\tau$ may be a user-defined value, or may be one of the parameters that is updated during back-propagation as the deep model is trained.

Functions $g_0$ and $g_1$ are the same modality-selecting functions described above with respect to Equation 4. In that regard, here as well, for within-modal discrimination, the processing system may be configured to generate $L_i^{NCE-C}$ values for each modality, such that, in a first pass, $g_0$ and $g_1$ are configured to perform within-modal discrimination based on the first modality (e.g., the embedded representations for the video streams of each instance), and, in a second pass, $g_0$ and $g_1$ are configured to perform within-modal discrimination based on the second modality (e.g., the embedded representations for the audio streams of each instance).

Likewise, for cross-modal discrimination, the processing system may be configured to generate $L_i^{NCE-C}$ values for each possible cross-modal pairing such that, in a first pass, $g_0$ is configured to select the first modality (e.g., the embedded representation for the video stream of its argument) and $g_1$ is configured to select the second modality (e.g., the embedded representation for the audio stream of its argument), and, in a second pass, $g_0$ is configured to select the second modality (e.g., the embedded representation for the audio stream of its argument) and $g_1$ is configured to select the first modality (e.g., the embedded representation for the video stream of its argument).

Further, in some aspects of the technology, the processing system may be configured to generate both cross-modal and within-modal $L_i^{NCE-C}$ values, and to sum all such values in the unified contrastive loss value $L^{CL}$.

Here as well, once $L_i^{NCE-I}$ values have been calculated for every possible pairing of an original instance of multi-modal training data $x$; and its modified counterpart $x_i$, and $L_i^{NCE-C}$ values have been calculated for every instance of labeled multi-modal training data, the processing system may use those loss values to generate a unified contrastive loss value $L^{CL}$ (312). Any suitable way of combining the $L_i^{NCE-I}$ and $L_i^{NCE-C}$ values may be used in this regard. For example, the processing system may generate a unified contrastive loss value $L^{CL}$ according to Equation 3 above. As already noted, where two passes are made for cross-modal or within-modal discrimination, the additional $L_i^{NCE-I}$ and $L_i^{NCE-C}$ values generated in each second pass may simply be summed together with those of the first pass to generate the unified contrastive loss value $L^{CL}$. Likewise, where both cross-modal and within-modal discrimination values are generated, these also may be summed together to generate the unified contrastive loss value $L^{CL}$.

In addition to the above, the feature vectors 306 and 318 may also be used to generate cross-entropy loss values. In that regard, in the example of FIG. 3, if $x_i$ is a multi-modal video clip, then the associated feature vector for the video stream $z_i^v$ (306) and the associated feature vector for the audio stream $z_i^a$ (318) will be concatenated together by a concatenation function 324 to generate a global representation $z_i$ (326) for the video clip. That global representation $z_i$ (326) will then be fed to a projection function $\eta$(328) to generate a projected vector $\bar{z}_i$ (330) which fuses the multi-modal features of the global representation $z_i$ (326) into a compact representation space.

On the other hand, if $x_i$ is a single-modal instance, then there will be nothing to concatenate, and function $\eta$(328) will be replaced with an identity-mapping function. As such, for any single-modal instance $x_i$, the projected vector $\bar{z}_i$ (330) of FIG. 3 will be the same as the feature vector generated for that single-modal instance ($z_i^v$(306) or $z_i^a$(318)).

The vector $\bar{z}_i$(330) will be processed differently depending on whether the given instance $x_i$ is labeled or unlabeled. If labeled, the processing system will feed $\bar{z}_i$ (330) to linear head $\Phi^l$ (332) for supervised learning. Linear head $\Phi^l$ (332) will process vector $\bar{z}_i$, to generate a vector $p_i^l$ (334) comprising the deep model's predicted probability regarding whether instance $x_i$ belongs to each possible category in the set of all categories $\{1, \ldots, C^l\}$, which are the labeled or known represented in the labeled instances of batch B. In some aspects of the technology, the output of linear head $\Phi^l$(332) will be subjected to SoftMax normalization in order to generate vector $p_i^l$ (334). The processing system will then generate a cross-entropy loss value $L^{CE}$ (336) based on vector $p_i^l$ (334) and the known label of instance $x_i$. Further, in some aspects of the technology, cross-entropy loss value $L^{CE}$ (336) may be an aggregate value based on a set of labeled instances. For example, in some aspects, the processing system may be configured to generate an individual cross-entropy loss value for each labeled instance in batch B (based on each instance's individual vector $p_i^l$ (334) and label), and then sum or average the individual cross-entropy loss values to generate an aggregate cross-entropy value $L^{CE}$ (336).

If $x_i$ is an unlabeled instance, the processing system will feed its associated vector $\bar{z}_i$(330) to linear head $\Phi^u$ (338) for new category discovery. Linear head $\Phi^u$ (338) will process vector $\bar{z}_i$, to generate a vector $p_i^u$ (340) comprising the deep model's predicted probability regarding whether instance $x_i$ belongs to each possible category in a set of new categories $\{1, \ldots, C^u\}$. In some aspects of the technology, the output of linear head $\Phi^u$ (338) will be subjected to SoftMax normalization in order to generate $p_i^u$ (340). The categories $\{1, \ldots, C^u\}$ are different than the categories $\{1, \ldots, C^l\}$ represented in the labeled instances of batch B, though they may relevant to one another. The processing system will generate a vector $p_i^u$(340) for all of the unlabeled instances in batch B.

In addition to above, during training (but not during inference), the processing system will also provide the vector $\bar{z}_i$(330) of any unlabeled instance to a WTA hashing function 342. WTA hashing function 342 will randomly generate a set of H permutations $\{\rho 1, \rho 2, \ldots, \rho H\}$. This is shown diagrammatically in box 342a of FIG. 3. When these permutations are applied to vector $\bar{z}_i$(330), each permutation will generate a random selection of k elements of vector $\bar{z}_i$ (330). Thus, for example, if k were 3, H were 3, and vector $\bar{z}_i$ (330) had ten elements, $\rho 1(\bar{z}_i)$ might select elements 1, 5, and 6 of $\bar{z}_i$, $\rho 2(\bar{z}_i)$ might select elements 2, 8, and 10 of $\bar{z}_i$, and $\rho 3(\bar{z}_i)$ might select elements 2, 3, and 9 of $\bar{z}_i$. The WTA algorithm will then select the highest value from each permutation to generate a set of H values. This is shown diagrammatically in box 342b. This set of values $\{c_i^1, c_i^2, \ldots, c_i^H\}$ is then output by the WTA hashing function as WTA hash code $c_i$ (344).

Although the above description assumes that each permutation will simply select k elements from within whatever vector it is applied to, in some aspects of the technology, each permutation may simply shuffle all of the elements of the vector it is applied to. In such a case, the WTA function may then be configured to select the highest value in the first k values of each permutation (or any other predefined set of k values within the shuffled vector, e.g., its last k values) in order to generate WTA hash code $c_i$ (344).

The processing system will generate a WTA hash code for all of the unlabeled instances in batch B. Once this is complete, for each given WTA hash code $c_i$ (344), the processing system will compare $c_i$ to every other hash code $c_j$ using a similarity function s (346) to generate a similarity score $s_{ij}$ (348). Any suitable function for comparing $c_i$ to $c_j$ may be used in this regard. For example, similarity score $s_{ij}$ may be generated according Equation 6 below:

$$s_{ij} = \begin{cases} 1, & \sum_{n=1}^{H}(c_i^n = c_j^n) \geq \mu \\ 0, & \text{otherwise} \end{cases} \quad (6)$$

In Equation 6, the function $(c_i^n = c_j^n)$ represents an element-by-element comparison of hash code $c_i$ and hash code $c_j$, each of which has H elements. In this example, it is assumed that, for a given element n, the function $(c_i^n = c_j^n)$ will return a 1 if element n of hash code $c_i$ is identical to element n of hash code $c_j$, and will otherwise return a 0. The summation from n=1 up to H will thus return a score representing how many of the elements of hash code $c_i$ and hash code $c_j$ are identical. If that sum is greater than or equal to a preselected scalar threshold value $\mu$, then the overall similarity score $s_{ij}$ will be 1; if not, the overall similarity score $s_{ij}$ will be 0. The total number of permutations H and the scalar threshold value $\mu$ may be any suitable value, and may be user-defined. For example, in some aspects of the technology, H may be equal to the dimension of the feature vectors (e.g., $z_i^v$(306) and $z_i^a$(318)), and thus may be 512. Likewise, $\mu$ may be an empirically derived value less than H, which is selected after testing a range of different values to see which value leads the deep model to perform best on one or more benchmark data sets, or according to any other suitable criteria. Thus, in some aspects of the technology, $\mu$ may have a value of 240. To illustrate, assuming H is 512 and $\mu$ is 240, similarity score $s_{ij}$ will only be 1 if at least 240 out of the 512 elements of hash code $c_i$ and hash code $c_j$ are identical.

Once the processing system has generated a similarity score $s_{ij}$ (348) for every possible pair of unlabeled instances in batch B, the processing system may use those similarity scores as pseudo labels to train the deep model to simultaneously learn representation and cluster assignments on the unlabeled data from new categories. In this way, the present technology enables the deep model to generate a cluster assignment for each unlabeled instance without requiring an additional offline clustering procedure. Any suitable loss function may be used in this regard. Thus, in some aspects of the technology, the processing system may generate a binary cross-entropy loss value $L^{BCE}$ (350) according to Equation 7 below:

$$L^{BCE} = \\ -\frac{1}{M^2}\sum_{i=1}^{M}\sum_{j=1}^{M}\left[s_{ij}\log\left(\phi^u(\bar{z}_i)^T\phi^u(\bar{z}_j)\right) + (1-s_{ij})\log\left(1-\phi^u(\bar{z}_i)^T\phi^u(\bar{z}_j)\right)\right] \quad (7)$$

In Equation 7, i and j are both indices of given instances of unlabeled training data, and M is the total number of unlabeled instances in batch B. In addition, $\Phi^u$ represents the function(s) performed by linear head $\Phi^u$ (338), as described above. In that regard, where Equation 7 lists $\Phi^u(\bar{z}_i)$, it will be understood that this is the same as vector $p_i^u$ (340) represented in FIG. 3, comprising the deep model's predicted probability regarding whether instance $x_i$ belongs to each possible category in a set of new categories $\{1, \ldots, C^u\}$. Likewise, where Equation 7 lists $\Phi^u(\bar{z}_j)$, it will be understood that this would be the vector comprising the deep model's predicted probability regarding whether instance xx belongs to each possible category in a set of new categories $\{1, \ldots, C^u\}$. Thus, the argument $\Phi^u(\bar{z}_i)^T \Phi^u(\bar{z}_j)$ represents matrix multiplication of the transpose of vector $p_i^u$ with the vector $p_j^u$.

In some aspects of the technology, the deep model may be trained based solely on the $L^{CL}$, $L^{CE}$, and $L^{BCE}$ values discussed above. For example, in some aspects, the $L^{CL}$, $L^{CE}$, and $L^{BCE}$ values for a given batch B may be summed to generate a total loss value L, and one or more parameters of the deep model may be modified based on L during a backpropagation step between each training batch. Likewise, in some aspects, one or more of the $L^{CL}$, $L^{CE}$, and $L^{BCE}$ values may be modified with a weighting factor and then summed in order to generate total loss value L. Further, in some aspects, one or more of the $L^{CL}$, $L^{CE}$ and $L^{BCE}$ values may be modified by a variable weighting factor that increases or decreases as training proceeds. For example, in some aspects of the technology, the total loss value L may be defined according to Equations 8 and 9 below:

$$L = L^{CE} + L^{BCE} + (1 - w(r))L^{CL} \quad (8)$$

$$w(r) = \lambda e^{-5\left(1-\frac{r}{T}\right)^2} \quad (9)$$

In Equations 8 and 9, w(r) is a variable weighting function which slowly increases from 0 to 1 as training progresses, r is the current epoch number, T is the total number of epochs to be used during training, and λ is a positive scaling factor.

Likewise, in some aspects of the technology, the deep model may be trained based on the $L^{CL}$, $L^{CE}$, and $L^{BCE}$ values discussed above, as well as a further consistency regularization loss value. In that regard, in some aspects, the processing system may be configured to generate a consistency loss value based on a comparison of the deep model's predictions for a given instance $x_i$ and its modified counterpart $x_{i'}$. That consistency loss value may then be added to the total loss value in order to train the deep model to generate the same category predictions for both the given instance and its modified counterpart. Any suitable loss function may be used in this regard. For example, the processing system may employ a mean squared error ("MSE") loss function for generating a consistency loss value $L_i^{MSE}$, according to Equation 10 below:

$$L_i^{MSE} + (\phi(\bar{z}_i) - \phi(\bar{z}_{i'}))^2 \quad (10)$$

The processing system may generate an $L_i^{MSE}$ value for every original labeled and unlabeled instance in batch B. As there are N original instances of training data in batch B, each of which is compared to a modified counterpart, there will be N generated $L_i^{MSE}$ values. In that regard, where symbol Φ is used in Equation 10, it is meant to represent the use of the function(s) of linear head $\Phi^l$(332) for all labeled instances and the use of the function(s) of linear head $\Phi^u$ (338) for all unlabeled instances. The processing system may then combine the $L_i^{MSE}$ values generated for all instances in batch B in any suitable way to generate a total consistency loss value $L^{MSE}$ for the batch. For example, in some aspects of the technology, the processing system may sum the $L_i^{MSE}$ values to generate a total consistency loss value $L^{MSE}$ for the batch. Likewise, in some aspects of the technology, the processing system may average the $L_i^{MSE}$ values to generate a total consistency loss value $L^{MSE}$ for the batch according to Equation 11 below:

$$L^{MSE} = \frac{1}{N}\sum_{i=1}^{N} L_i^{MSE} \quad (11)$$

The total loss value $L^{MSE}$ may then be added to the $L^{CL}$, $L^{CE}$, and $L^{BCE}$ values discussed above to generate a total loss value L. Here as well, in some aspects of the technology, the $L^{CL}$, $L^{CE}$, $L^{BCE}$, and $L^{MSE}$ values for a given batch B may be summed to generate a total loss value L, and one or more parameters of the deep model may be modified based on L during a backpropagation step between each training batch. Likewise, in some aspects, one or more of the $L^{CL}$, $L^{CE}$, $L^{BCE}$, and $L^{MSE}$ values may be modified with a weighting factor and then summed in order to generate total loss value L. Further, in some aspects, one or more of the $L^{CL}$, $L^{CE}$, $L^{BCE}$, and $L^{MSE}$ values may be modified by a variable weighting factor that increases or decreases as training proceeds. For example, in some aspects of the technology, the total loss value L may be generated according to Equations 12 and 13 below:

$$L = L^{CE} + L^{BCE} + (1 - w(r))L^{CL} + w(r)L^{MSE} \quad (12)$$

$$w(r) = \lambda e^{-5\left(1-\frac{r}{T}\right)^2} \quad (13)$$

As above, in Equations 12 and 13, w(r) is a variable weighting function which slowly increases from 0 to 1 as training progresses, r is the current epoch number, T is the total number of epochs to be used during training, and λ is a positive scaling factor.

Figure 4A:
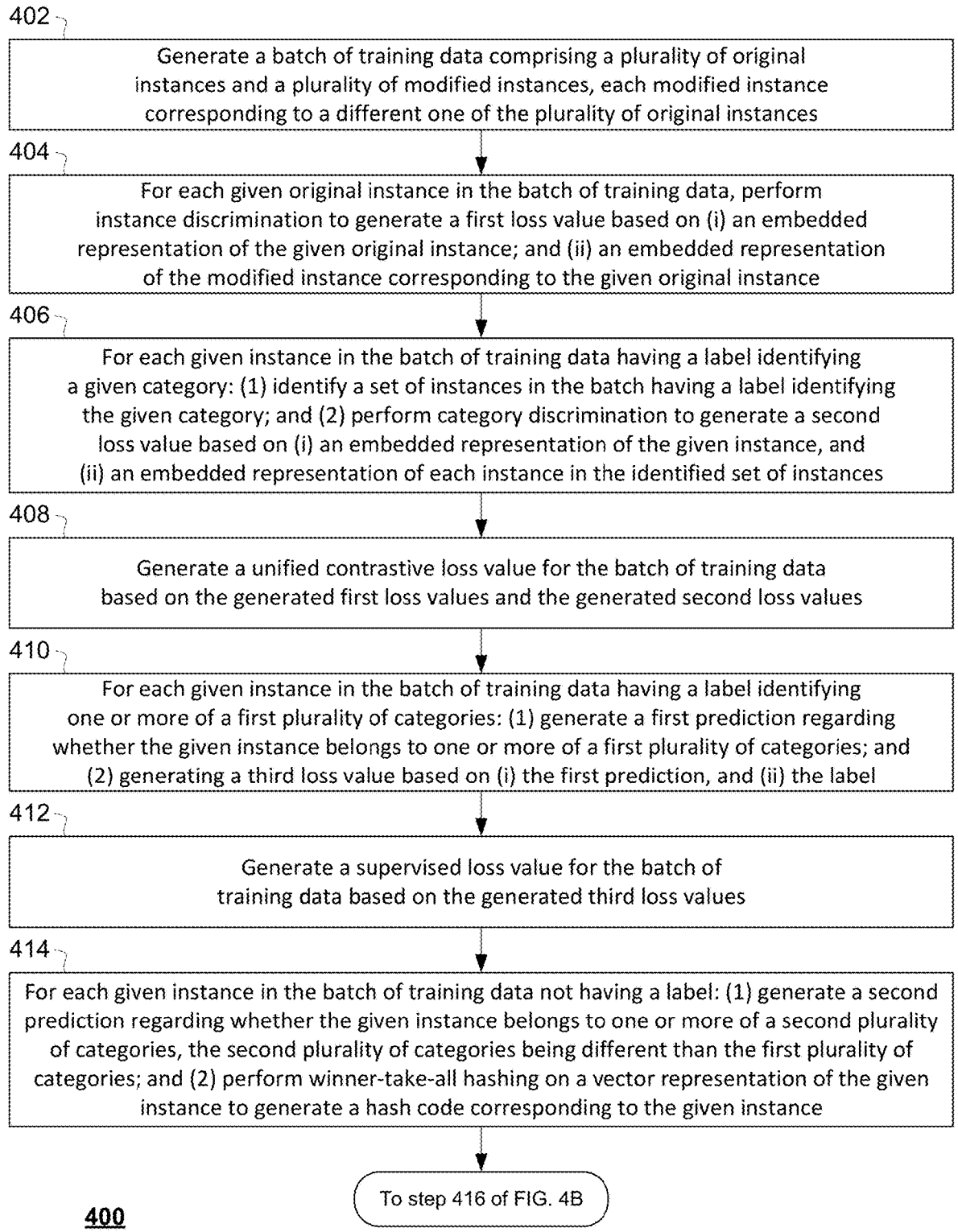

FIGS. 4A and 4B set forth an exemplary method 400 showing how a deep learning model may be trained, in accordance with aspects of the disclosure.

In that regard, in step 402, the processing system (e.g., processing system 102) generates a batch of training data comprising a plurality of original instances and a plurality of modified instances, each modified instance corresponding to a different one of the plurality of original instances. In some aspects of the technology, the processing system may be configured to generate each modified instance. In some aspects of the technology, the modified instances may be preexisting (e.g., generated by another processing system). In such a case, the processing system may generate the batch of training data by simply identifying a set of original instances and a set of modified instances to be included in the batch.

In step 404, for each given original instance in the batch of training data, the processing system performs instance discrimination to generate a first loss value based on (i) an embedded representation of the given original instance, and (ii) an embedded representation of the modified instance corresponding to the given original instance. The embedded representations of step 404 may be generated in any suitable way. For example, as described above, the processing system may be configured to process the given original instance and the modified instance using a feature encoder (e.g., visual feature encoder $f_v$(304) or audio feature encoder $f_a$ (316) of FIG. 3) to generate a corresponding feature vector (e.g., feature vector $z_i^v$ (306) or $z_i^a$(318) of FIG. 3), and then process the feature vectors using an MLP (e.g., MLPs $h_v$ (308) and $h_a$ (320) of FIG. 3) to generate corresponding embedded representations (e.g., embedded representation $\hat{z}_i^v$ (310) or $\hat{z}_i^a$ (322) of FIG. 3). Further, the processing system may perform instance discrimination according to any suitable loss function. For example, in some aspects of the technology, the processing system may generate each first loss value as described above with respect to Equations 1 and 4, depending on whether the given original instance is single- or multi-modal.

In step 406, for each given instance in the batch of training data having a label identifying a given category, the processing system: (1) identifies a set of instances in the batch having a label identifying the given category; and (2) performs category discrimination to generate a second loss value based on (i) an embedded representation of the given instance, and (ii) an embedded representation of each instance in the identified set of instances. Here as well, the embedded representations of step 406 may be generated in any suitable way, including as discussed above with respect to elements 302-310 and 314-322 of FIG. 3. Likewise, the processing system may perform category discrimination according to any suitable loss function. For example, in some aspects of the technology, the processing system may generate each second loss value as described above with respect to Equations 2 and 5, depending on whether the given instance is single- or multi-modal.

In step 408, the processing system generates a unified contrastive loss value for the batch of training data based on the generated first loss values and the generated second loss values. The processing system may use the generated first loss values and the generated second loss values to generate this unified contrastive loss value in any suitable way. For example, in some aspects of the technology, the processing system may be configured to generate each first loss value as described above with respect to Equations 1 and/or 3, to generate each second loss value as described above with respect to Equations 2 and/or 5, and to then generate the unified contrastive loss value based thereon as described above with respect to Equations 3.

In step 410, for each given instance in the batch of training data having a label identifying one or more of a first plurality of categories, the processing system: (1) generates a first prediction regarding whether the given instance belongs to one or more of the first plurality of categories; and (2) generating a third loss value based on (i) the first prediction, and (ii) the label. The processing system may generate the first prediction and the third loss values in any suitable way.

For example, in some aspects of the technology, the processing system may be configured to process any multimodal instance using two or more feature encoders (e.g., visual feature encoder $f_v$ (304) and audio feature encoder $f_a$ (316) of FIG. 3) to generate two or more corresponding feature vectors (e.g., feature vector $z_i^v$ (306) and $z_i^a$ (318) of FIG. 3), to concatenate the corresponding feature vectors to generate a global representation (e.g., global representation $z_i$ (326) of FIG. 3), to project the global representation using a projection function to generate a projected vector (e.g., projected vector $\bar{z}_i$ (330) of FIG. 3) which fuses the multimodal features of the global representation, and to feed the projected vector to a linear head (e.g., linear head $\Phi^l$ (332) of FIG. 3) to generate a vector (e.g., vector $p_i^l$ (334) of FIG. 3) comprising the deep model's prediction regarding whether the given instance belongs to one or more of the first plurality of categories.

Likewise, in some aspects of the technology, the processing system may be configured to process any single-modal instance using a feature encoder (e.g., visual feature encoder $f_v$ (304) or audio feature encoder $f_a$ (316) of FIG. 3) to generate a corresponding feature vector (e.g., feature vector $z_i^v$ (306) or $z_i^a$ (318) of FIG. 3), to project the corresponding feature vector using an identity function to generate a projected vector (e.g., projected vector $\bar{z}_i$ (330) of FIG. 3), and to feed the projected vector to a linear head (e.g., linear head $\Phi^l$ (332) of FIG. 3) to generate a vector (e.g., vector $p_i^l$ (334) of FIG. 3) comprising the deep model's prediction regarding whether the given instance belongs to one or more of the first plurality of categories. In both cases, the first plurality of categories may be a set or subset of all categories $\{1, \ldots, C^l\}$ represented in the labeled instances of the batch of training data.

Further, the processing system may perform supervised learning according to any suitable loss function. For example, in some aspects of the technology, the processing system may generate each third loss value as a cross-entropy loss value (e.g., cross-entropy loss value $L^{CE}$ (336) of FIG. 3) based on a vector comprising the first prediction (e.g., vector $p_i^l$ (334) of FIG. 3) and the known label of the given instance.

In step 412, the processing system generates a supervised loss value for the batch of training data based on the generated third loss values. Here as well, the processing system may generate the supervised loss value in any suitable way. For example, in some aspects of the technology, the processing system may generate each third loss value as a cross-entropy loss value (e.g., cross-entropy loss value $L^{CE}$ (336) of FIG. 3) based on a vector comprising the first prediction (e.g., vector $p_i^l$ (334) of FIG. 3) and the known label of the given instance, and then may be configured to sum or average the generated third loss values in order to generate the supervised loss value.

In step 414, for each given instance in the batch of training data not having a label, the processing system: (1) generates a second prediction regarding whether the given instance belongs to one or more of a second plurality of categories, the second plurality of categories being different than the first plurality of categories; and (2) performs winner-take-all hashing, using the one or more processors, on a vector representation of the given instance to generate a hash code corresponding to the given instance. Here as well, the processing system may generate the second prediction and the hash codes in any suitable way.

For example, in some aspects of the technology, the processing system may be configured to process any multimodal instance using two or more feature encoders (e.g., visual feature encoder $f_v$ (304) and audio feature encoder $f_a$ (316) of FIG. 3) to generate two or more corresponding feature vectors (e.g., feature vector $z_i^v$ (306) and $z_i^a$ (318) of FIG. 3), to concatenate the corresponding feature vectors to generate a global representation (e.g., global representation $z_i$ (326) of FIG. 3), to project the global representation using a projection function to generate a projected vector (e.g., projected vector $\bar{z}_i$ (330) of FIG. 3) which fuses the multimodal features of the global representation, and to feed the projected vector to a linear head (e.g., linear head $\Phi^u$ (338) of FIG. 3) to generate a vector (e.g., vector $p_i^u$ (340) of FIG. 3) comprising the deep model's prediction regarding whether the given instance belongs to one or more of the second plurality of categories. In some aspects of the technology, the processing system may be further configured to normalize the output of the linear head using a SoftMax function.

Likewise, in some aspects of the technology, the processing system may be configured to process any single-modal instance using a feature encoder (e.g., visual feature encoder $f_v$ (304) or audio feature encoder $f_a$ (316) of FIG. 3) to generate a corresponding feature vector (e.g., feature vector $z_i^v$ (306) or $z_i^a$ (318) of FIG. 3), to project the corresponding feature vector using an identity function to generate a projected vector (e.g., projected vector $\bar{z}_i$ (330) of FIG. 3), and to feed the projected vector to a linear head (e.g., linear head $\Phi^u$ (338) of FIG. 3) to generate a vector (e.g., vector $p_i^u$ (340) of FIG. 3) comprising the deep model's prediction regarding whether the given instance belongs to one or more of the second plurality of categories. Here as well, in some aspects of the technology, the processing system may be further configured to normalize the output of the linear head using a SoftMax function. In both cases, the second plurality of categories may be a set of categories $\{1, \ldots, C^u\}$ that is different than the set of categories $\{1, \ldots, C^l\}$ represented in the labeled instances of the batch of training data, though these sets of new and already known categories may nevertheless be relevant to one another.

Further, the processing system may perform the winner-take-all hashing in any suitable way. For example, in some aspects of the technology, the processing system may be configured to apply a set of permutations to a vector representation of the given instance (e.g., projected vector $\bar{z}_i$ (330) of FIG. 3), with each permutation generating a random selection of k elements of the vector representation (e.g., as shown in box 342a of FIG. 3). The processing system may be further configured to select the highest value from each random selection (e.g., as shown in box 342b of FIG. 3), and to combine those highest values to generate the hash code (e.g., WTA hash code $c_i$ (344) of FIG. 3).

Likewise, in some aspects of the technology, the processing system may be configured to apply a set of permutations to a vector representation of the given instance (e.g., projected vector $\bar{z}_i$ (330) of FIG. 3), with each permutation randomly shuffling all elements of the vector representation in a different way. The processing system may be further configured to select a set of k values from each permutation (e.g., the first k values, last k values, etc.), and select the highest value from each set of k values. The processing system may then be configured to combine those highest values to generate the hash code (e.g., WTA hash code $c_i$ (344) of FIG. 3).

In step 416, the processing system generates an unsupervised loss value for the batch of training data based on the generated second predictions and the generated hash codes. The processing system may use the generated second predictions and the generated hash codes to generate this unsupervised loss value in any suitable way. For example, in some aspects of the technology, the processing system may be configured to compare each generated hash code $c_i$ to every other generated hash code cc using a similarity function (e.g., similarity function s (346) of FIG. 3) to generate a set of similarity scores (e.g., similarity score $s_{ij}$ (348) of FIG. 3) as described above with respect to Equation 6, and then generate the unsupervised loss value as a binary cross-entropy loss value (e.g., binary cross-entropy loss value $L^{BCE}$ (350) of FIG. 3) as described above with respect to Equation 7.

In step 418, the processing system generates a total loss value for the batch of training data based on the unified contrastive loss value, the supervised loss value, and the unsupervised loss value. The processing system may use the unified contrastive loss value, the supervised loss value, and the unsupervised loss value to generate this total loss value in any suitable way. For example, in some aspects of the technology, the processing system may be configured to sum the unified contrastive loss value, the supervised loss value, and the unsupervised loss value to generate this total loss value. Likewise, in some aspects, the processing system may be configured to modify one or more of the unified contrastive loss value, the supervised loss value, or the unsupervised loss value with a weighting factor, and then sum them in order to generate this total loss value. Further, in some aspects, one or more of the unified contrastive loss value, the supervised loss value, or the unsupervised loss value may be modified by a variable weighting factor that increases or decreases as training proceeds, such as described above with respect to Equations 8 and 9.

In step 420, the processing system modifies one or more parameters of the neural network based on the total loss value. Here as well, the total loss value may be used to modify the one or more parameters in any suitable way during back-propagation.

Figure 5:
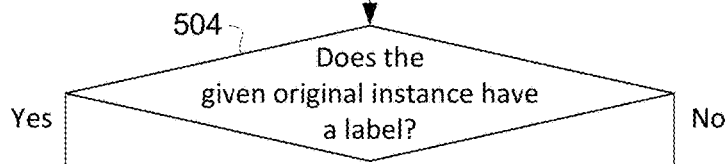
FIG. 5 depicts an exemplary method showing additional optional steps that may be added to the exemplary method of FIG. 4 to train a deep learning model, in accordance with aspects of the disclosure.

FIG. 5 sets forth an exemplary method 500 showing additional optional steps that may be added to the exemplary method 400 to train a deep learning model, in accordance with aspects of the disclosure. In that regard, steps 502-512 may be performed at any suitable time prior to steps 418 and 420 of exemplary method 400, including in series or in parallel with one or more of steps 402-416.

As shown in box 502 of FIG. 5, the processing system will perform steps 504-508 for each given original instance in the batch of training data, and then proceed to step 510.

In that regard, in step 504, the processing system determines if the given original instance has a label.

If so (as shown by the "yes" arrow in FIG. 5), in step 506, the processing system generates a fourth loss value based on the first prediction generated for the given original instance and the first prediction generated for the modified instance corresponding to the given original instance. The processing system may use these first predictions to generate the fourth loss value in any suitable way. For example, in some aspects of the technology, after the first predictions have been generated (as discussed above with respect to step 410 of FIG. 4A), the processing system may employ a mean squared error loss function to generate an individual consistency loss value $L_i^{MSE}$ between those predictions as described above with respect to Equation 10.

If not (as shown by the "no" arrow in FIG. 5), in step 508, the processing system generates a fifth loss value based on the second prediction generated for the given original instance and the second prediction generated for the modified instance corresponding to the given original instance. Here as well the processing system may use the second predictions to generate the fifth loss values in any suitable way. For example, in some aspects of the technology, after the second predictions have been generated (as discussed above with respect to step 414 of FIG. 4A), the processing system may employ a mean squared error loss function to generate an individual consistency loss value $L_i^{MSE}$ between those predictions as described above with respect to Equation 10.

In step 510, the processing system generates a consistency loss value for the batch of training data based on the generated fourth loss values and the generated fifth loss values. The processing system may use the generated fourth loss values and fifth loss values to generate the consistency loss value in any suitable way. For example, in some aspects of the technology, the processing system may sum the fourth and fifth loss values to generate the consistency loss value for the batch. Likewise, in some aspects of the technology, the processing system may average the fourth and fifth loss values to generate the consistency loss value for the batch, as described above with respect to Equation 11.

In step 512, the processing system will further base the total loss value generated in step 418 of FIG. 4B on the consistency loss value generated in step 510. In that regard, the processing system may use the unified contrastive loss value, the supervised loss value, the unsupervised loss value, and the consistency loss value to generate this total loss value in any suitable way. For example, in some aspects of the technology, the processing system may be configured to sum the unified contrastive loss value, the supervised loss value, the unsupervised loss value, and the consistency loss value to generate this total loss value. Likewise, in some aspects, the processing system may be configured to modify one or more of the unified contrastive loss value, the supervised loss value, the unsupervised loss value, or the consistency loss value with a weighting factor, and then sum them in order to generate this total loss value. Further, in some aspects, one or more of the unified contrastive loss value, the supervised loss value, the unsupervised loss value, or the consistency loss value may be modified by a variable weighting factor that increases or decreases as training proceeds, such as described above with respect to Equations 12 and 13.

Finally, as shown in box 514, the modified total loss value generated according to step 512 will be used to modify one or more parameters of the neural network, as described above with respect to step 420 of FIG. 4B.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A method of training a neural network to classify data, comprising:
for each given original instance in a batch of training data comprising a plurality of original instances and a plurality of modified instances, performing instance discrimination to generate a first loss value, using one or more processors of a processing system, based on an embedded representation of the given original instance and an embedded representation of the modified instance corresponding to the given original instance;
for each given instance in the batch of training data having a label identifying a given category:
identifying in the batch, using the one or more processors, a set of instances having a label identifying the given category; and
performing category discrimination to generate a second loss value, using the one or more processors, based on an embedded representation of the given instance and an embedded representation of each instance in the identified set of instances;
generating, using the one or more processors, a unified contrastive loss value for the batch of training data based on the generated first loss values and the generated second loss values;
for each given instance in the batch of training data having a label identifying one or more of a first plurality of categories:
generating, using the one or more processors, a first prediction regarding whether the given instance belongs to one or more of the first plurality of categories; and
generating, using the one or more processors, a third loss value based on the first prediction and the label identifying the one or more of the first plurality of categories;
generating, using the one or more processors, a supervised loss value for the batch of training data based on the generated third loss values;
for each given instance in the batch of training data not having a label:
generating, using the one or more processors, a second prediction regarding whether the given instance belongs to one or more of a second plurality of categories, the second plurality of categories being different than the first plurality of categories; and
performing winner-take-all hashing, using the one or more processors, on a vector representation of the given instance to generate a hash code corresponding to the given instance;
generating, using the one or more processors, an unsupervised loss value for the batch of training data based on the generated second predictions and the generated hash codes;
generating, using the one or more processors, a total loss value for the batch of training data based on the unified contrastive loss value, the supervised loss value, and the unsupervised loss value; and
modifying, using the one or more processors, one or more parameters of the neural network based on the total loss value.

2. The method of claim 1, further comprising generating, using the one or more processors, the batch of training data, wherein generating the batch of training data comprises identifying the plurality of original instances and the plurality of modified instances to be included in the batch.

3. The method of claim 1, further comprising generating, using the one or more processors, the batch of training data, wherein generating the batch of training data comprises, for each given original instance, generating a modified instance corresponding to the given original instance.

4. The method of claim 1, wherein, for each given original instance in the batch of training data, performing instance discrimination to generate the first loss value further comprises:
generating, using the one or more processors, the embedded representation of the given original instance by processing the given original instance using a feature encoder to generate a first feature vector, and processing the first feature vector using a multi-layer perceptron; and
generating, using the one or more processors, the embedded representation of the modified instance corresponding to the given original instance by processing the modified instance corresponding to the given original instance using a feature encoder to generate a second feature vector, and processing the second feature vector using a multi-layer perceptron.

5. The method of claim 1, wherein, for each given instance in the batch of training data having a label identifying a given category, performing category discrimination to generate the second loss value for each given instance further comprises:
generating, using the one or more processors, the embedded representation of the given instance by processing the given instance using a feature encoder to generate a third feature vector, and processing the third feature vector using a multi-layer perceptron.

6. The method of claim 1, further comprising:
for each given original instance in the batch of training data:
if the given original instance has a label, generating a fourth loss value, using the one or more processors, based on the first prediction generated for the given original instance and the first prediction generated for the modified instance corresponding to the given original instance; and
if the given original instance does not have a label, generating a fifth loss value, using the one or more processors, based on the second prediction generated for the given original instance and the second prediction generated for the modified instance corresponding to the given original instance; and
generating, using the one or more processors, a consistency loss value for the batch of training data based on the generated fourth loss values and the generated fifth loss values;

wherein generating the total loss value for the batch of training data is further based on the consistency loss value.

7. The method of claim 6, further comprising generating, using the one or more processors, the batch of training data, wherein generating the batch of training data comprises identifying the plurality of original instances and the plurality of modified instances to be included in the batch.

8. The method of claim 6, further comprising generating, using the one or more processors, the batch of training data, wherein generating the batch of training data comprises, for each given original instance, generating a modified instance corresponding to the given original instance.

9. The method of claim 6, wherein, for each given original instance in the batch of training data, performing instance discrimination to generate the first loss value further comprises:
  generating, using the one or more processors, the embedded representation of the given original instance by processing the given original instance using a feature encoder to generate a first feature vector, and processing the first feature vector using a multi-layer perceptron; and
  generating, using the one or more processors, the embedded representation of the modified instance corresponding to the given original instance by processing the modified instance corresponding to the given original instance using a feature encoder to generate a second feature vector, and processing the second feature vector using a multi-layer perceptron.

10. The method of claim 6, wherein, for each given instance in the batch of training data having a label identifying a given category, performing category discrimination to generate the second loss value for each given instance further comprises:
  generating, using the one or more processors, the embedded representation of the given instance by processing the given instance using a feature encoder to generate a third feature vector, and processing the third feature vector using a multi-layer perceptron.

11. A processing system comprising:
  a memory storing a neural network; and
  one or more processors coupled to the memory and configured to use the neural network to classify data, wherein the neural network has been trained to classify data pursuant to a training method comprising:
    for each given original instance in a batch of training data comprising a plurality of original instances and a plurality of modified instances, performing instance discrimination to generate a first loss value based on an embedded representation of the given original instance and an embedded representation of the modified instance corresponding to the given original instance;
    for each given instance in the batch of training data having a label identifying a given category:
      identifying, in the batch, a set of instances having a label identifying the given category; and
      performing category discrimination to generate a second loss value based on an embedded representation of the given instance and an embedded representation of each instance in the identified set of instances;
    generating a unified contrastive loss value for the batch of training data based on the generated first loss values and the generated second loss values;
    for each given instance in the batch of training data having a label identifying one or more of a first plurality of categories:
      generating a first prediction regarding whether the given instance belongs to one or more of the first plurality of categories; and
      generating a third loss value based on the first prediction and the label identifying the one or more of the first plurality of categories;
    generating a supervised loss value for the batch of training data based on the generated third loss values;
    for each given instance in the batch of training data not having a label:
      generating a second prediction regarding whether the given instance belongs to one or more of a second plurality of categories, the second plurality of categories being different than the first plurality of categories; and
      performing winner-take-all hashing on a vector representation of the given instance to generate a hash code corresponding to the given instance;
    generating an unsupervised loss value for the batch of training data based on the generated second predictions and the generated hash codes;
    generating a total loss value for the batch of training data based on the unified contrastive loss value, the supervised loss value, and the unsupervised loss value; and
    modifying one or more parameters of the neural network based on the total loss value.

12. The processing system of claim 11, wherein the training method further comprises generating the batch of training data, wherein generating the batch of training data comprises identifying the plurality of original instances and the plurality of modified instances to be included in the batch.

13. The processing system of claim 11, wherein the training method further comprises generating the batch of training data, wherein generating the batch of training data comprises, for each given original instance, generating a modified instance corresponding to the given original instance.

14. The processing system of claim 11, wherein the step of the training method directed to, for each given original instance in the batch of training data, performing instance discrimination to generate the first loss value further comprises:
  generating the embedded representation of the given original instance by processing the given original instance using a feature encoder to generate a first feature vector, and processing the first feature vector using a multi-layer perceptron; and
  generating the embedded representation of the modified instance corresponding to the given original instance by processing the modified instance corresponding to the given original instance using a feature encoder to generate a second feature vector, and processing the second feature vector using a multi-layer perceptron.

15. The processing system of claim 11, wherein the step of the training method directed to, for each given instance in the batch of training data having a label identifying a given category, performing category discrimination to generate the second loss value for each given instance further comprises:
  generating the embedded representation of the given instance by processing the given instance using a feature encoder to generate a third feature vector, and processing the third feature vector using a multi-layer perceptron.

16. The processing system of claim 11, wherein the training method further comprises:
for each given original instance in the batch of training data:
if the given original instance has a label, generating a fourth loss value based on the first prediction generated for the given original instance and the first prediction generated for the modified instance corresponding to the given original instance; and
if the given original instance does not have a label, generating a fifth loss value based on the second prediction generated for the given original instance and the second prediction generated for the modified instance corresponding to the given original instance; and
generating a consistency loss value for the batch of training data based on the generated fourth loss values and the generated fifth loss values;
wherein generating the total loss value for the batch of training data is further based on the consistency loss value.

17. The processing system of claim 16, wherein the training method further comprises generating the batch of training data, wherein generating the batch of training data comprises identifying the plurality of original instances and the plurality of modified instances to be included in the batch.

18. The processing system of claim 16, wherein the training method further comprises generating the batch of training data, wherein generating the batch of training data comprises, for each given original instance, generating a modified instance corresponding to the given original instance.

19. The processing system of claim 16, wherein the step of the training method directed to, for each given original instance in the batch of training data, performing instance discrimination to generate the first loss value further comprises:
generating the embedded representation of the given original instance by processing the given original instance using a feature encoder to generate a first feature vector, and processing the first feature vector using a multi-layer perceptron; and
generating the embedded representation of the modified instance corresponding to the given original instance by processing the modified instance corresponding to the given original instance using a feature encoder to generate a second feature vector, and processing the second feature vector using a multi-layer perceptron.

20. The processing system of claim 16, wherein the step of the training method directed to, for each given instance in the batch of training data having a label identifying a given category, performing category discrimination to generate the second loss value for each given instance further comprises:
generating the embedded representation of the given instance by processing the given instance using a feature encoder to generate a third feature vector, and processing the third feature vector using a multi-layer perceptron.

* * * * *